W. H. KLOCKE.
DISK WHEEL FOR VEHICLES.
APPLICATION FILED FEB. 2, 1920.
1,383,728.
Patented July 5, 1921.
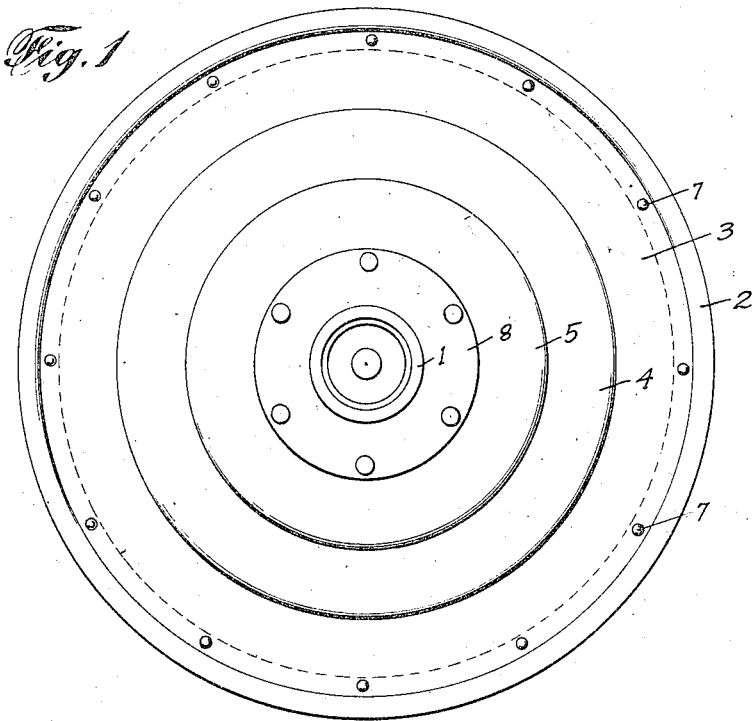
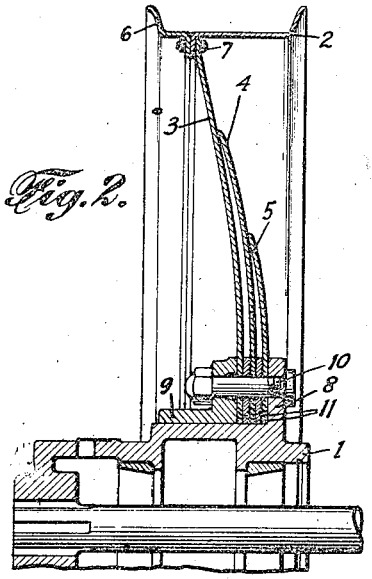
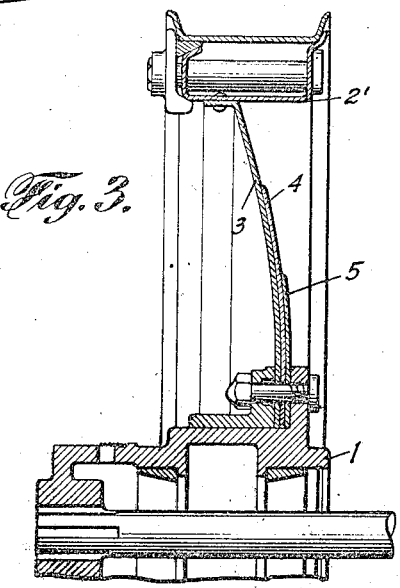
Inventor
William H. Klocke.
By his Attorney
Jas. H. Griffin

UNITED STATES PATENT OFFICE.

WILLIAM H. KLOCKE, OF WOODHAVEN, NEW YORK, ASSIGNOR OF ONE-HALF TO HARRY F. HUGHES, OF BROOKLYN, NEW YORK.

DISK WHEEL FOR VEHICLES.

1,383,728.     Specification of Letters Patent.     Patented July 5, 1921.

Application filed February 2, 1920. Serial No. 355,728.

*To all whom it may concern:*

Be it known that I, WILLIAM H. KLOCKE, a citizen of the United States, residing at Woodhaven, county of Queens, and State of New York, have invented a certain new and useful Disk Wheel for Vehicles, of which the following is a specification.

This invention relates to disk wheels for vehicles and is more particularly intended for use with the wheels of motor vehicles.

Disk wheels, as usually constructed, embody a suitable hub which is spaced from the rim of the wheel by a disk or disks rigidly secured to the hub and the rim. When a single disk is employed, it simply serves the function of a web between these parts, whereas, the employment of two disks, simply serves the function of two webs. When two disks are employed, they are generally dished in opposite directions, so as to be spaced apart where they are secured to the hub for the purpose of imparting lateral rigidity and strength to the wheel. Considerable attention has been devoted by engineers to providing for lateral rigidity in disk wheel construction and many attempts have been made to produce a disk wheel which will be radially resilient but extensive experience in the manufacturing and use of disk wheels has convinced me that resiliency to effect easy riding of a car should be obtained through the use of proper tires and correct spring suspension of the car body, and that the more important feature in disk wheel construction is to provide against the shocks of lateral stresses without jeopardizing the integrity of the parts of the wheel.

With these considerations in mind, the object of the present invention is to provide a disk wheel which will be laterally resilient to such an extent as to enable it to take up or dissipate lateral shocks or stresses due to quick turning, skidding or the striking of obstructions, in a simple and efficient manner, and without unduly encumbering the wheel.

In one of its practical embodiments, a wheel, constructed, in accordance with this invention, has the hub thereof spaced from the rim by a plurality of superimposed plates or disks of progressively smaller diameters, imparting to the spacing portion of the wheel a cross section greatly resembling a leaf spring, and functioning as such so that, through the section, thus formed, lateral strains and stresses are automatically taken up by the wheel during its normal operation. Wheel construction, thus organized, is not only susceptible to all strains which may be encountered without damage to the wheel, but relieves the axle shafts or axle spindles of said strains.

Features of the invention, other than those specified, will be apparent from the following detailed description when read in conjunction with the accompanying drawings and from the appended claims.

In the accompanying drawings, I have illustrated different practical embodiments of the invention, but the constructions therein shown are to be understood as illustrative only and not as defining the limits of the invention.

Figure 1 is the face view of a wheel, embodying the present invention;

Fig. 2 is a central section in the plane of the line 2—2 of Fig. 1; and

Fig. 3 is a section similar to Fig. 2 but illustrating a slightly modified form of wheel.

While the present invention may be incorporated in disk wheels of widely varying structures, I have illustrated in Fig. 1 of the drawings one of the simplest forms of construction of which it is susceptible. In carrying out the invention, as shown in this figure, as well as in Fig. 2 which shows the central section, the hub 1 of the wheel is spaced from the rim 2 by means of a plurality of plates or disks 3, 4 and 5 of progressively smaller diameters. The rim 2 is of the permanent type and is split to provide a removable section 6 to allow of the positioning on, or the removal of, a tire. Section 6 is normally maintained, however, in engagement with the remaining section of the rim by a plurality of bolts 7, and these bolts may be availed of to secure the outer margin of the disk 3 to the rim, as shown.

The hub 1 is of a conventional type and is provided with a flange 8, integral with the hub, and the flange 9 removable therefrom. Bolts 10 are adapted to be passed through alined apertures in the flanges 8 and 9 and extend through similar apertures in the disks 3, 4 and 5, for the purpose of clamping said disks tightly between the flanges 8 and 9 and securely mounting the hub relative to said disks. While the disks 3, 4 and 5 may be in face-abutting relation, they are shown as spaced apart at the hub by filler-rings 11 and, while all of the disks are dished, the disk 4 is dished to a greater degree than the disk 3, and the disk 5 is dished to a still greater degree, whereby the circumferential portion of the disk 4 will engage with the adjacent space of the disk 3 while the like portion of the disk 5 would correspondingly co-act with the disk 4.

The disks 3, 4 and 5 are, in practice, preferably made of less gage material than would be the case if only one rigid disk were to be employed, and the disks 4 and 5 serve to back up the disk 3, which fact, together with the further fact that the material from which the disks are formed possesses resilient or springy characteristics, imparts to the spacing portion of the wheel a leaf spring cross section.

In Fig. 2 the disks 3, 4 and 5 are shown as spaced apart at the hub and serve as a support for split rim, but in Fig. 3, a slightly modified form of construction is shown wherein the filler-rings 11 are omitted and a conventional form of demountable rim incorporated. By omitting the filler-rings 11 the disks are brought into face-abutting relation throughout, but the leaf spring section is retained and functions in substantially the same manner as in the construction of Fig. 2.

The permanent and demountable form of rim, shown in Fig. 3, forms no part of the present invention and is merely introduced to show that this invention may be incorporated in widely different disk wheel construction without departing from the spirit of the invention. In fact, the present invention is not restricted to a spring section extending from the hub throughout the full distance to the rim, since said spring section may be made to extend only a part of such distance and a more or less rigid section interposed as a connecting link or section. A structure of this general character is shown in my co-pending application on disk wheels, filed February 2, 1920, Serial No. 355,729, wherein the wheel rim is carried by the brake drum and the hub spaced from the brake drum by the spring section embodying the present invention. Such a construction embodies the present invention, even though the spring section does not extend from the hub to the rim, for the reason that, nevertheless, the spring section actually spaces the hub from the rim, even though it accomplishes this through the intermediary brake drum flange.

In a wheel constructed along the lines specified, full lateral resiliency is provided for and the wheel is highly efficient in automatically dissipating shocks and jars to which a wheel is subjected during normal operation. A wheel of the present invention, moreover, possesses some radial resiliency but this is incidental and is not considered by me as so important as the lateral resiliency embodied therein. Through the provision of lateral resiliency in a disk wheel, the twisting strains and torques, as well as the bending strain, imposed upon the axles and axle spindles by rigid disk wheels as usually made, are avoided as such shocks are taken up by the wheel.

It will be manifest from the foregoing description that the present invention is capable of broad general application in disk wheel construction and is to be understood as broadly novel as is commensurate with the appended claims.

Having thus fully described the invention, what I claim as new and desire to secure by Letters Patent is:

1. A disk wheel embodying a hub, a rim, and a plurality of superimposed resilient disks of progressively smaller diameters for supporting the hub from the rim, each of said disks being dished in cross section with the concave surface of each disk fitted over the convex surface of the next adjacent and larger disk, whereby that portion of the wheel which the disks form partakes of a spring-like radial section adapted to support the hub in laterally resilient relation to the rim.

2. A disk wheel embodying a hub, a rim, and a plurality of disks positioned between the hub and the rim, said disks being of progressively smaller diameter and dished in cross section with the convex face of the larger of each two adjacent disks extending into the concavity of the next adjacent smaller disk.

3. A disk wheel embodying a hub, a rim, and a plurality of disks positioned between the hub and the rim, said disks being of progressively smaller diameter and dished in cross section with the convex face of the larger of each two adjacent disks extending into the concavity of th next adjacent smaller disk, the margins of each of the smaller disks being in contact with the next larger disk and all of the said disks being spaced from one another adjacent the hub of the wheel.

4. A disk wheel embodying a hub, a rim, and a disk section comprising a plurality of disks of successively smaller diameters, all of the disks being dished in the same direction and the smaller disks being of successively greater curvature, whereby they may be assembled with the margins of the smaller disks in contact with the next larger disks, while the centers of the disks, adjacent the hub, are spaced apart.

5. A disk wheel embodying a hub, a rim, a disk section comprising a plurality of disks of successively smaller diameters, all of the disks being dished in the same direction and the smaller disks being of successively greater curvature, whereby they may be assembled with the margins of the smaller disks in contact with the next larger disks, while the centers of the disks, adjacent the hub, are spaced apart, means encircling the hub between each two adjacent disks for so spacing them apart, and means for securing the disks to the hub.

In testimony whereof, I have signed my name to this specification.

WILLIAM H. KLOCKE.